United States Patent [19]

LaBounty

[11] Patent Number: 4,872,264
[45] Date of Patent: Oct. 10, 1989

[54] HEAVY DUTY PLATE SHEAR

[76] Inventor: Roy E. LaBounty, HC2 Box 105E, Two Harbors, Minn. 55616

[21] Appl. No.: 142,654

[22] Filed: Jan. 11, 1988

[51] Int. Cl.$^4$ ............................................. B23P 19/00
[52] U.S. Cl. ......................................... 30/210; 30/134; 30/258
[58] Field of Search ................. 30/134, 258, 253, 273, 30/275, 272, 216, 227, 219, 210

[56] References Cited

U.S. PATENT DOCUMENTS

| | | |
|---|---|---|
| 1,035,096 | 8/1912 | Kraut . |
| 2,632,246 | 3/1953 | Shoffner . |
| 2,760,265 | 8/1956 | Docken ............................ 30/258 X |
| 2,934,822 | 5/1960 | Docken ............................ 30/258 X |
| 3,325,895 | 6/1967 | Grimoldi et al. . |
| 3,814,152 | 6/1974 | Pallari . |
| 3,885,292 | 5/1975 | Sharp et al. . |
| 3,972,097 | 8/1976 | Schakat . |
| 4,104,792 | 8/1978 | LaBounty . |
| 4,188,721 | 2/1980 | Ramun et al. . |
| 4,198,747 | 4/1980 | LaBounty . |
| 4,217,000 | 8/1980 | Watanabe . |
| 4,376,340 | 3/1983 | Ramun et al. . |
| 4,382,625 | 5/1983 | LaBounty . |
| 4,403,431 | 9/1983 | Ramun et al. . |
| 4,439,921 | 4/1984 | Ramun et al. . |
| 4,519,135 | 5/1985 | LaBounty . |
| 4,536,976 | 8/1985 | Holopainen . |
| 4,541,177 | 9/1985 | Hollander . |
| 4,543,719 | 10/1985 | Pardoe . |
| 4,558,515 | 12/1985 | LaBounty . |
| 4,670,983 | 6/1987 | Ramun et al. . |
| 4,686,767 | 8/1987 | Ramun et al. . |

Primary Examiner—Douglas D. Watts
Attorney, Agent, or Firm—Palmatier & Sjoquist

[57] ABSTRACT

Disclosed is a heavy-duty plate cutting shear to be carried on an elevated lifting device, comprising a frame with a mounting mechanism for attaching to such a device, a slidable foot affixed on the frame and having an unobstructed base face for engaging and sliding along the plate being sheared, the slidable foot having an elongate slot opening through the base face and also having metal shearing edges at both sides of the slot and adjoining the face, a swingably oscillatable blade having pivot mounted on the foot, the blade being in the slot and extending form the pivot and across the base face, the blade having metal cutting edges confronting and traversing the shearing edges on the foot.

27 Claims, 3 Drawing Sheets 4,872,264

HEAVY DUTY PLATE SHEAR

This invention relates to heavy-duty shears of the type to be mounted on the boom structure of a hydraulic excavator or similar implement for cutting steel plate.

BACKGROUND OF THE INVENTION

In recent years, heavy-duty shears have come into use for cutting I-beams, heavy steel pipes, steel columns and girders, all for the purpose of reducing such steel to be recycled through a steel mill for further use. Typically such heavy-duty shears are used in demolishing buildings and other structures by cutting the columns and girders and also shearing reinforcing rods used in poured concrete for strengthening the concrete structure. Also such shears have been widely used in scrap yards for simply reducing the size of scrap steel for recycling. Such scrap steel may be in a wide variety of forms, including girders, I-beams, columns and pipes. Shears that have previously been known have been somewhat usable for shearing some plate-like structures, such as the paneling used in railroad boxcars. However, previously known equipment has had considerable difficulty in efficiently cutting steel plate and reducing it to a size to be efficiently handled and loaded into containers to be shipped back to the steel mills.

SUMMARY OF THE INVENTION

An object of the invention is to produce a heavy-duty shear to be supported from the boom structure of a hydraulic excavator or crane for shearing or slitting steel plates as often used in structural or tank environments.

A feature of the invention is a portable heavy-duty shear attachable to such a boom structure or other elevated support and having stationary and movable jaws with shearing edges simultaneously and progressively shearing juxtaposed sides of an elongate strip from a plate and disposing of the strip.

Another feature of the invention is a portable heavy-duty shear attachable to such a boom structure or elevated support and having a stationary jaw with a pair of juxtaposed cutting edges to lie against one side of a plate and a swingably selectable blade to protrude through the plate and oscillating between the cutting edges while traversing the plate and cutting out a strip of the plate without springing or deforming adjacent areas of the plate.

Another feature is a plate cutting shear using an oscillating blade moving between juxtaposed stationary cutting edges of a stationary jaw or foot, and an unobstructed area adjacent the stationary jaw and spaced transversely from the cutting edges to receive the cut out strip from the cutting station. The unobstructed area may be bounded by a deflector confronting the stationary foot to turn and guide the cut out strip away from the cutting station.

Another feature of the invention is a sliding foot to bear against and slide along the plate to be cut and a swingable blade protruding through a slot in the foot swingable back through the slot and across shear edges along the slot. The blade is driven from above the foot and is shaped to cut progressively away from the pivot to loosen a strip from the plate. The strip is simultaneously bent as it is cut to move transversely through the slot of the foot.

Still another feature of the invention is a plate cutting shear with a swingably oscillatable blade and a stationary jaw or foot with juxtaposed edges between and across which the blade moves. The oscillatable jaw defines a strip-guiding face adjacent the jaw's pivot and lying transversely of the blade and of the stationary jaw to bend the strip back on itself as the shear advances through the plate.

Another feature of the invention is the arrangement of the hub portion of the oscillatable blade in and adjacent the slot to engage and guide the strip cut from the plate. The hub portion may have a cone shaped deflector surface for engaging the strip in various relations as the blade is oscillated.

DETAILED SPECIFICATION

Figure 1:
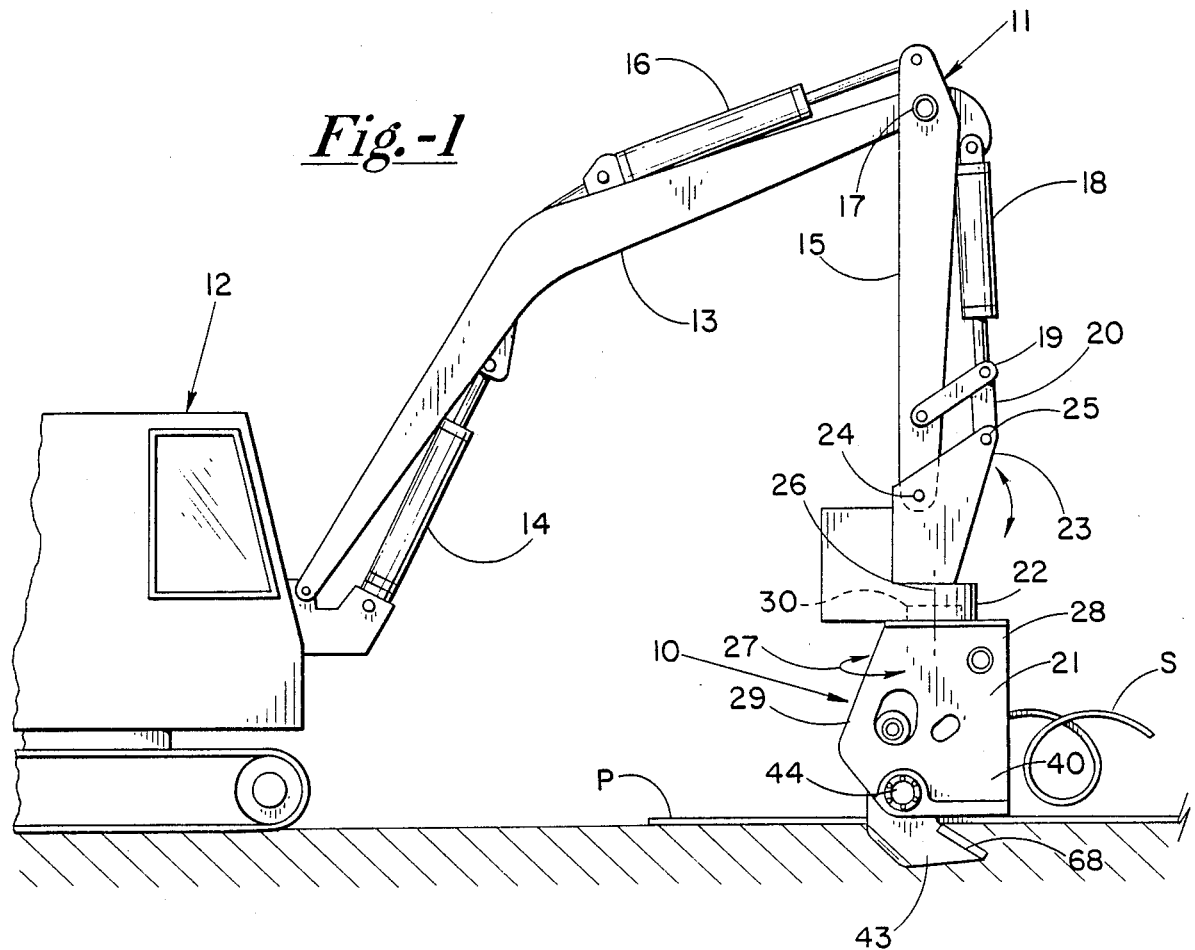
FIG. 1 is a an elevation view of the invention shown mounted and ready for use.
Figure 4:
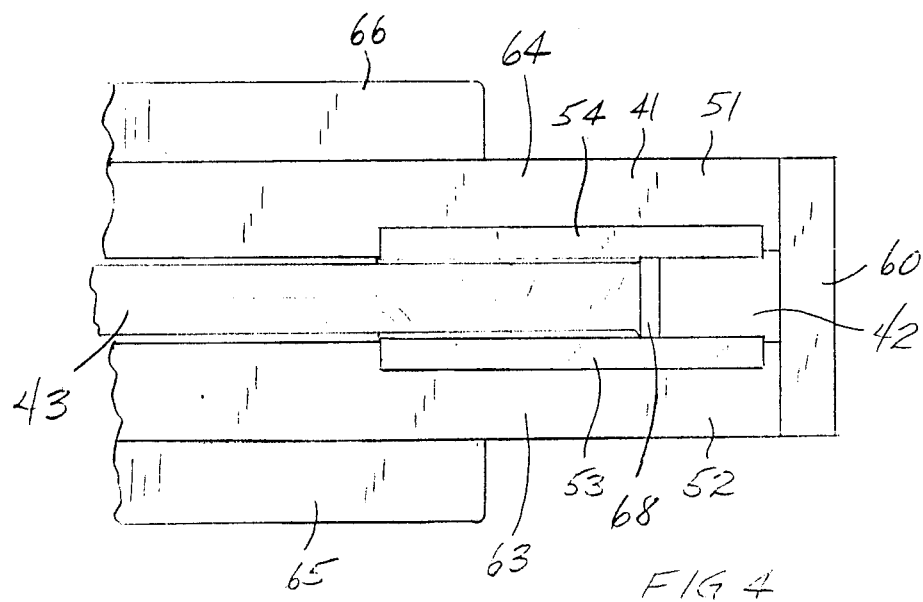
FIG. 4 is a detailed bottom plan view.

One form of the invention is illustrated in the drawings and is described herein. The heavy-duty plate shear is indicated in general by numeral 10 and is to be mounted on an elevated lifting device 11, one form of which is illustrated in the drawings. Such a lifting device as illustrated constitutes the boom structure of a hydraulic excavator 12. The boom structure includes the conventional boom 13 of the hydraulic excavator which may be raised and lowered by the hydraulic cylinders 14. The boom structure or elevated lifting device 11 also includes a second member or dipper stick 15 pivotally mounted on the end of the boom 13. The dipper stick 15 may be swung to various orientations with respect to the boom 13 by a hydraulic cylinder 16 which is mounted on the boom 13 and the piston rod of which is pivotally connected to the dipper stick in spaced relation with the mounting pivot 17 of the dipper stick. The dipper stick 15 is often used, in connection with the hydraulic excavator 12, to mount a digging bucket or other tool. The dipper stick carries a hydraulic cylinder 18, and the piston rod of the hydraulic cylinder is pivotally connected to a linkage which includes a swingable link 19 pivotally mounted on the dipper stick 15, and an extension link 20 which is to be pivotally connected to the tool, in this case the heavy-duty plate cutting shear 10.

As illustrated, the shear 10 has a lower frame and shear body 21, and an upper frame and a mounting structure 22. The upper frame and mounting structure 22 includes the mounting brackets 23 which provide tilting means for the shear when attached as by pins 24 and 25 to the end of the dipper stick 15 and to the extension link 20. The entire shear 10 is tiltable about a pivot or pin 24 so as to orient the shear 10 at various tilt angles. The tilting of the shear is accomplished by extension and retraction of the hydraulic cylinder 18 which produces swinging of the entire shear 10 about pivot 24.

The lower frame and shear body 21 is rotatable with respect to the upper frame and mounting structure 22, about an axis 26, as to produce rotation of the shear body 21 in the direction indicated by arrow 27. The rotation of the shear body allows for reversing of the front and rear sides 28 and 29, respectively, of the shear body so that the shearing may progress in either direction with respect to the hydraulic excavator 12. In other words, if a plate is lying substantially horizontally as on the ground, the reversibility of the shear body about the rotation axis 26 allows the shearing to progress either away from the cab of the hydraulic excavator or toward the hydraulic excavator. Similarly, if the plate is oriented vertically, as in the situation of a sidewall plate in an above-ground upright cylindrical tank, the reversibility of the shear body with respect to the mounting brackets 23 and stick 15 allow the shear to be oriented so that the shear may be started at the top edge of an upright plate and shearing will progress in a downward direction through the plate. Similarly, in some instances cutting might be necessary in an upward movement of the shear on such an upright plate and that can be accomplished by reason of the reversibility of the shear body 21 with respect to the mounting brackets 23 and dipper stick 15. The shear 10 has successfully sheared strips from steel plates P with a thickness of up to one and one-fourth inch.

Of course the rotatability of the shear body with respect to the mounting brackets will allow movement of the shear along the plate in other directions as well.

The lower frame and shear body 21 is mounted to the upper frame 22 by a bearing structure 30, and the rotation is accomplished by a reversible hydraulic motor 31 and a gear structure 32 functioning to revolve the lower frame and shear body 21 about the axis 26 as the motor 31 is operated.

The lower frame and shear body 21 may also be mounted in other manners to accommodate the particular location in which is the plate shearing is to be carried out. For instance, a pair of mounting brackets 33, illustrated in phantom lines in FIG. 2, may be mounted on the back side of the shear body 21 for mounting the shear body in another way. In one form, the shear body may be suspended as by cables from the boom of a cable crane so as to allow the shear to work down through an upright sidewall plate of an upright cylindrical steel tank structure.

The lower frame and shear body 21 of shear 10 includes a pair of rigid side plates 34 and 35, a front frame plate 36 and a rear frame plate 37. The side plates 34 and 35 are affixed as by welding to the front and rear frame plates 36 and 37 so as to define an integral structure with an open interior. Openings in side plates 34 and 35 reduce the weight and allow access into the open interior of the shear body 21.

The lower frame and shear body 21 also includes a top plate 38 which is also affixed as by welding to the side plates 34 and 35 and to the front and rear frame plates 36 and 37.

Figure 2:
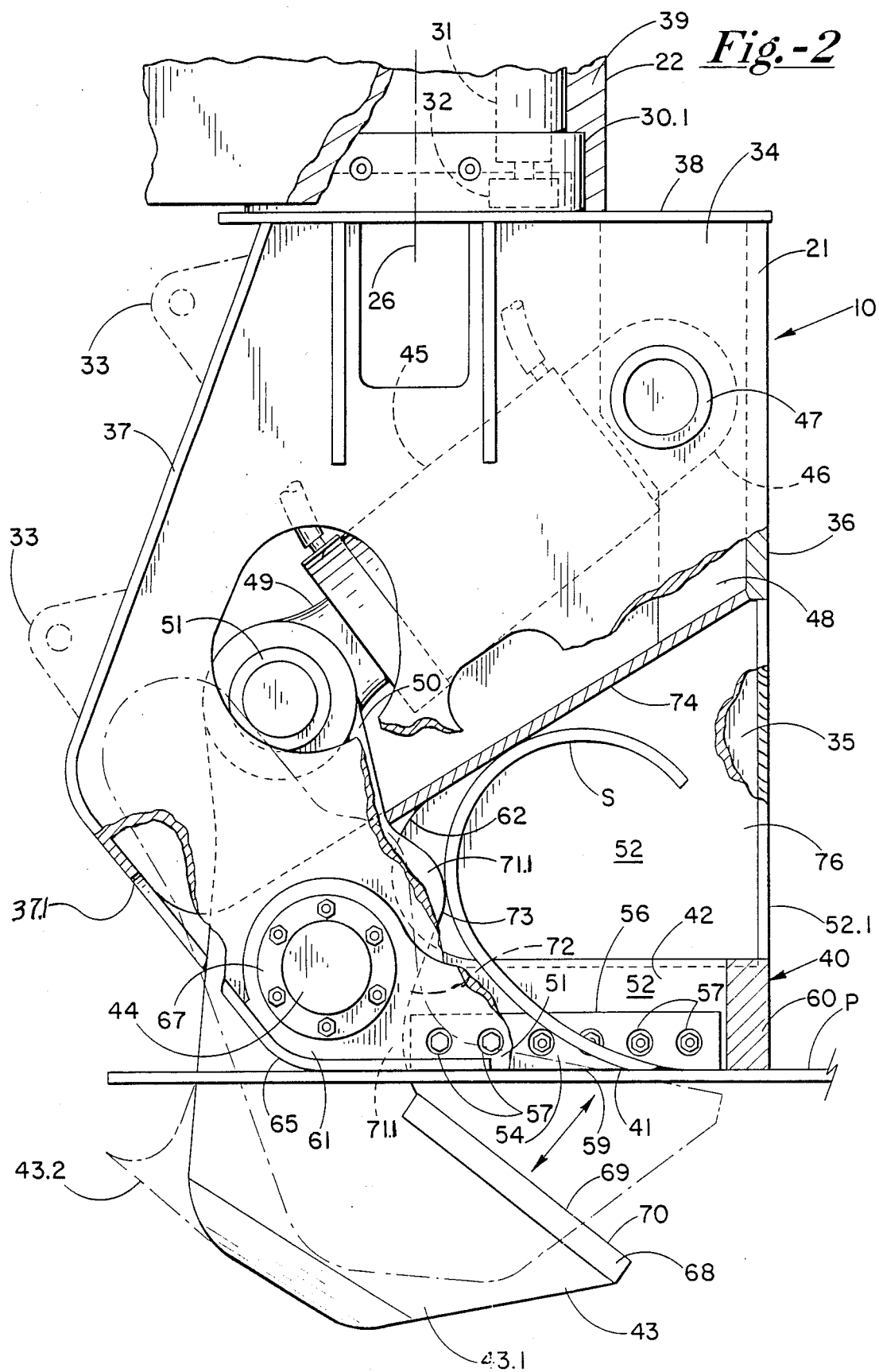
FIG. 2 is an enlarged detailed elevation view, partly broken away for clarity of detail.

The bearing 30 which interconnects the upper shear body 22 and the lower shear body 21 is connected to the top frame plate 38, and a portion of the bearing is illustrated in FIG. 2 and is indicated by the numeral 30.1. The upper shear body 22 has a generally cylindrical housing portion 39 to receive the annular portion 30.1 of the bearing, to accommodate the rotation of the shear body 21 about the axis 26.

Figure 3:
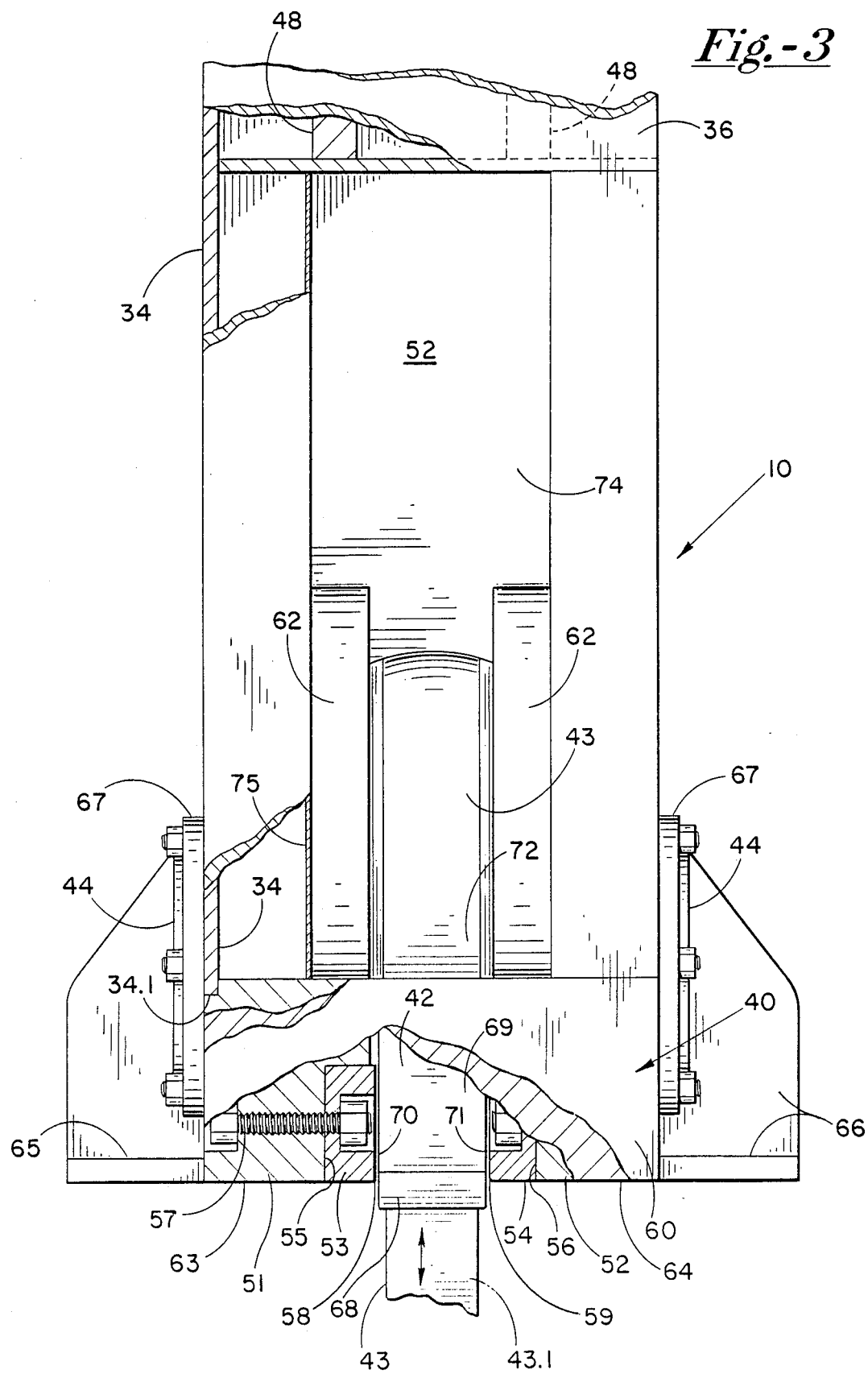
FIG. 3 is an enlarged detailed end elevation view with portions thereof broken away for clarity of detail.

The lower shear body 21 incorporates a stationary shear structure or foot, indicated in general by numeral 40 and having a base face 41 to engage and bear against the surface of the plate P being sheared. The foot 40 has an elongate slot 42 through which a steel, swingably oscillatable shear blade 43 extends and swings for shearing the strip S from the plate P. The strip S has a width which is substantially the same as the width or thickness of the slot 42 as seen in FIG. 3. A pivot structure and bearing 44 swingably mounts the shear blade 43 on the foot 40 to permit the swinging of the blade 43 through the slot 42 to effect the shearing of a strip from the plate.

A hydraulic cylinder 45 has its base end bracket 46 mounted on a rigid pivot tube 47 which is affixed into the sidewall plates 34, 35 and into a pair of auxiliary frame plates 48 which are affixed as by welding to the front frame plate 36 and to the top frame plate 38.

The hydraulic cylinder 45 has its extendible piston rod 49 connected to the inner end or arm 50 of the shear blade 43 by a pivot bearing 51 so that when the piston rod 49 is extended and retracted, the shear blade 43 will swingably oscillate to effect shearing of the plate.

It will be recognized that the shear body 21 defines an open and unobstructed space 52 located adjacent the foot 40 and is in open communication with the slot 42 to receive the strip S as it is sheared from the plate P. The unobstructed space 52 opens at 52.1 through the front side 28 of the shear body 21 to permit the strip S to be discharged from the unobstructed space 52 and from the shear body 21 as the shearing progresses along the plate P.

More specifically, the foot 40 of the shear includes a pair of steel base plates 51 and 52 which are formed of steel and which are affixed as by welding to the side plates 34, 35. The two side plates 51 and 52 lie along the elongate slot 42, and form the stationary shear blades with which the swingable blade 43 operates to shear the plate. The base plates 51, 52 removably mount hardened steel inserts or shear knives 53, 54 which are mounted in recesses or seats 55, 56. The hardened inserts or knives 53, 54 are removably affixed in the base plates by bolts 57, the heads and nuts thereof being recessed into the base plates and shear knives respectively. Because the shear knives 53, 54 are stationary with the base plate 51, 52, the shear knives effectively are a part of the stationary shear blades formed by the base plates 51, 52 and the shear knives 53,54 actually define the metal shearing edges 58, 59 of the foot 40.

The outer end portions of the base plates 51, 52 are interconnected by a steel tie plate 60 which lies across the ends of the base plates 51, 52 and is affixed to the base plates as by welding. The outer portions of the base plates are thereby stationary with respect to each other.

The pivot structure 44 mounts the swingable shear blade 43 on the inner portions 61 of the base plates 51, 52 and maintain the spacing between the inner portions of the base plates. The inner portions 61 of the base plates 51, 52 define an arcuatly curved deflector face 62 facing the unobstructed space 52.

The base plates 51, 52 define substantially flat base faces 63, 64, which together define the base face 41 of the foot 40.

It will be recognized that the inner portions 61 of the base plates have wing plates 65, 66 affixed thereto as by welding and extending outwardly as to form extensions of the base faces 63, 64. The wing plates 65, 66 contribute to the stability of the shear as it engages and moves along the plate P.

The slot 42 between the base plates 51, 52 extends toward the rear side of the shear body to the lower edge 37.1 of the rear frame plate 37. It will be recognized that the rear frame plate 37 and the adjacent portions of the side plates 34, 35 are shaped to define the interior space of shear body 21 as to accommodate the extension and retraction of the piston rod 49 of the hydraulic cylinder 45 and as to accommodate the swinging movement of the inner end 50 of the swingable blade 43.

Clamp rings 67 are a part of the pivot structure and are bolted to the base plates 51, 52 to confine the pivot structure in the base plate.

The swingable shear blade 43 includes a hardened steel shear knife or face plate 68 which is affixed as by welding to the body portion 43.1 of the shear blade. The hardened face plate may be periodically removed and replaced as needed, or may be refaced as needed. The hardened steel face plate 68 of the swingable blade defines the bearing face 69 thereof and the opposite sides of the face plate 68 cooperates with the bearing face to define the metal cutting edges 70 and 71 which confront and traverse the shearing edges 58, 59 respectively of the foot 40 to shear the strip S from the plate P.

It will be recognized that the face plate 68 of the shear blade extends only along the shearing edges 58, 59 but the blade 43 also defines a hub portion 71.1 adjacent the pivot. The hub portion 71.1 of the shear blade 43 provides a deflector face or surface 72 which lies transversely of the shearing edges 70, 71 and of the metal cutting edges 58, 59, and the deflector surface 72 confronts the inner side of the unobstructed space 52 as to engage and deflect the strip S which is being sheared from the plate. A portion 73 of the deflector face 72 is cam shaped which progressively varies in distance from the axis of swinging of the blade 43, and as the blade 43 is swingably oscillated, the cam shaped portion 73 continuously changes its orientation with respect to the strip S being cut from the plate so that the cam shaped deflector surface prevents the strip from being jammed or caught within the unobstructed space.

In addition to the moving deflector surfaces 72, 73 of the hub portion 71.1 of the blade 43, a stationary strip guiding rigid steel plate 74 is affixed to the side plates 34, 35 of the shear body 21 as by welding and forms the top wall of the unobstructed space 52. The plate 74 is obliquely oriented as an inclined angle and forms an acute and oblique angular relation with respect to the base face 41 of the foot, diverging from the area of the pivot structure 44. The plate 74 defines a stationary deflector face 74.1 adjacent the hub portion 71.1 of the swingable shear blade 43 and cooperates with the deflector face 72 and the cam shaped portion 73 thereof in turning and guiding the strip S as it emerges from the slot 42. In FIG. 2 it will be recognized that the front or upper edge of the guide plate 74 abuts and is welded to the lower edge of the front frame plate 36.

The two side plates 34, 35 have their lower edges recessed into and welded to the outer transverse sides of the base plates 51, 52, as indicated at 34.1 in FIG. 3.

The shear body 21 also has a pair of rigid, stationary baffle plates 75, 76 lying along and in spaced relation with the two side plates 34, 35 respectively. The baffle plates 75, 76 are generally triangular in shape and have their upper and lower edges respectively affixed as by welding to the guide plate 74 and to the respective base plates 51, 52. The baffle plates 75, 76 confront the unobstructed space 52 and function to confine and direct the strip as it is deflected through the space 52 and also exerts stiffening pressure on the portions of base plates 51, 52 adjacent the slot 42 to minimize any possible deflection as by twisting of these base plates and stationary shear blades.

It will be recognized that the mounting plates 48 which mount the pivot tube for the hydraulic cylinder are welded to the inclined guide plate 74 as well as to the front plate 36 and the top plate 38.

In some instances, the shear blade 43 may be shaped as to define a spearing point 43.2 as illustrated in dotted lines in FIG. 2 in order to pierce the plate to be sheared and thereby form an access for the blade 43 in order to start the shearing process.

In operation, the shear may be oriented in any of a number of positions to shear a plate which may be lying on the ground or which may be either in an upright position or an inclined or tilted position. Often times the shear will be used to cut the plate of an upright structure wherein the plates are orientated vertically, as in the sidewall of a cylindrical upright tank which is being demolished. In most circumstances the shear will be lifted to the top of the upright plate and then will work downwardly through the plate. Alternately, the plate may lie on the ground as illustrated in FIG. 1.

As the shear approaches the plate being sheared, the base face 41 of the foot will lie against one face of the plate and the entire shear body 21 will be located adjacent the same face of the plate. Only the blade 43 will protrude the plate, and the width or thickness of the blade is no greater than the width of the slot being cut in the plate and the strip S being removed from the plate. Accordingly, the plate being cut need not be bent or sprung or otherwise deformed during the cutting process. A strip is simply cut from the plate with a width which is substantially the same as the width of the face plate 68 of the swinging blade 43.

As the blade 43 obtains access to the back side of the plate, the shearing may commence by rapidly cycling the operation of the hydraulic cylinder 45 as to rapidly extend and retract the piston rod 49 thereof. This action of the piston rods of the hydraulic cylinder causes the blade 43 to swingably oscillate in and through the slot 42. Of course such cycling of the cylinder 45 is effected by operation of the valve supplying hydraulic fluid under pressure to the cylinder.

Simultaneously with the oscillation of the blade 43, the shear body 21 is moved or urged along the surface of the plate, causing the foot 40 to slide across the plate, or in the event that the plate is vertical, the foot will slide down the plate.

As the blade 43 is swung from the full line position as seen in FIG. 2 to the dotted line position in FIG. 2, the edges of the strip S are cut from the plate by the edges 70, 71 of the face plate 68 acting against the edges 58, 59 of the stationary blades which are defined by the base plates 51, 52 together with the insert knives 53, 54. It will be observed that during each inward shearing stroke of the blade 43, a portion of the strip S is sheared from the plate, and as the strip is being sheared, it is bent into the slot 42 and into the unobstructed space 52 adjacent the slot.

As the shear blade 43 is swung outwardly away from the foot 40, the shear body 21 will move along the plate P, either by action of gravity in the event that the work is being done on an upright plate, or by action of the hydraulic excavator machine 12 in the event that the plate is lying in a substantially horizontal position. Of course the shear body 21 may be moved along a horizontal plate P by action of the hydraulic cylinder 16 on the boom 13 in order to swing the dipper stick 15 and thereby move the shear along the plate. Of course other moving techniques are possible with the machinery illustrated and with other lifting devices which are capable of mounting the shear 10.

As the face plate 68 of the blade moves out of the slot 42, and the shear body 21 moves along the plate, the strip will engage one or both of the deflector faces 72, 73, or the deflector face 74.1 of the plate 74 and the strip will substantially curl or form a bight and the strip will appear to roll out of the space 52 and out of the front opening 52.1.

It will be recognized in FIG. 2, that the tip end of the blade 43 and of the face plate 58 thereof will be maintained in spaced relation to the transverse tie plate 60 and preferably to avoid shearing off the strip S in each stroke.

It will be recognized that it is particularly advantageous that all of the operating mechanism of the shear 10 is disposed at one side of the plate P, with the exception that only the shear blade 43 protrudes through the plate during the normal operation of the shear.

The shear, in FIG. 1, is shown to be operating away from the cab of the hydraulic excavator machine 12, but in may instances it may be desirable to reverse the orientation of the shear body 21 and cause the shear to work toward the cab or body of the hydraulic excavator machine 12.

As the blade 43 is oscillated, and the strip S is deflected by the cam shaped surface 73 of the hub portion of the blade, the cam shaped deflector surface 73 continuously changes its orientation with respect to the surface of the strip so as to continuously urge the strip outwardly toward the front opening 52.1 of the unobstructed space 52.

The shear may take different forms within the scope of the invention. In certain shears, the cylinder (here shown to be oriented obliquely to the base face 41) may be oriented nearly normal to the base face, and portions of side plates 34, 35 may be omitted adjacent the strip receiving space 52. The hub portion of the swingable shear blade will continue to deflect the strip, and the guide plate 74 may be oriented more nearly normal to the base face. Accordingly in such an arrangement, the shear body will be generally "L-shaped", with the stationary blade or base plates forming the base of the L.

Of course other shapes of the shear body are possible within the scope of the invention.

It will be seen that I have provided a new and improved heavy-duty plate cutting shear which is portable and is carried on an elevated lifting device such as a hydraulic excavator or similar machine. The plate being cut may be oriented at any of a number of angels or may be oriented entirely horizontally or entirely vertically. The shear cuts a strip from the plate and effectively cuts plate without the need for any deformation or springing of the plate in order to effectuate a demolishing of the plate into small pieces.

We claim:

1. A heavy-duty plate cutting shear to be carried on an elevated lifting device, comprising
   frame means with mounting means for attaching to such a device,
   a slidable foot affixed on the frame means and having an unobstructed base face for engaging and sliding along the plate being sheared, the slidable foot having an elongate slot opening through the base face and also having metal shearing edges at both sides of the slot and adjoining the face,
   a swingably oscillatable blade having pivot means mounted on the foot, the blade being in the slot and extending from the pivot means and across the base face, the blade having metal cutting edges confronting and traversing the shearing edges on the foot,
   and a hydraulic cylinder on the frame means and connected with the blade in the slot and oscillating the blade across the shearing edges of the foot.

2. A heavy-duty plate cutting shear according to claim 1 and there being an unobstructed space adjacent the foot, the slot in the foot also opening in a direction away from the base face and into said unobstructed space to permit material sheared by said edges from the plate to move into the unobstructed space.

3. A heavy-duty plate cutting shear according to claim 2 wherein the foot includes inner and outer portions along the slot, the inner portion being adjacent the pivot means, the frame means including side panel portions confining the hydraulic cylinder and partially confining said unobstructed space, said panel portions defining a discharge opening adjacent the outer portion of the foot.

4. A heavy-duty plate cutting shear according to claim 2 and rigid means defining deflector surfaces adjacent the unobstructed space and confronting the slot to engage and guide sheared plate material away from the hydraulic cylinder.

5. A heavy-duty plate cutting shear according to claim 4 wherein said rigid means and deflector surfaces are stationary with respect to the blade, said rigid means includes a plate between said space and the hydraulic cylinder.

6. A heavy-duty plate cutting shear according to claim 4 wherein said rigid means and deflector surfaces are stationary with respect to said frame means.

7. A heavy-duty plate cutting shear according to claim 1 and the base face being substantially flat, only the swingably oscillatable blade traversing the base face.

8. A heavy duty plate cutting shear to be carried on an elevated lifting device, comprising
   frame means with mounting means for attaching to such a device,
   a slidable foot affixed on the frame means and having an unobstructed base face for engaging and sliding along the plate being sheared, the slidable foot having an elongate slot opening through the base face and also having metal shearing edge portions adjacent the slot.
   a swingably oscillatable blade having pivot means mounted on the foot, the blade being in the slot and extending from the pivot means and across the base face, the blade having metal cutting edge portions confronting and traversing the shearing edge portions on the foot to cooperate therewith in shearing a strip from the plate as the blade is oscillated, the blade having a hub portion adjacent the pivot means,
   guiding means on the frame means and including a stationary strip building panel portion spaced from and confronting the slot, said guiding means defining an unobstructed space adjacent the foot and hub portion of the blade to receive the strip emerging from the slot, said strip guiding panel portion and base face extending obliquely of and at an acute angle with each other and diverging generally away from the pivot means,
   and means for swingably oscillating the blade in the slot and across the shearing edges of the foot.

9. A heavy-duty plate cutting shear according to claim 8 and said hub portion having a cam-shaped deflector surface for varying the relationship between the deflector surface and the strip emerging from the slot as the blade is swingably oscillated.

10. A heavy duty plate cutting shear to be carried on an elevated lifting device, comprising
frame means with mounting means for attaching to such a device,
a slidable foot affixed on the frame means and having an unobstructed base face for engaging and sliding along the plate being sheared, the slidable foot having an elongate slot opening through the base face and also having metal shearing edges at both sides of the slot and adjoining the face, said metal shearing edges having inner end portions adjacent the pivot means,
a swingably oscillatable blade having pivot means mounted on the foot, the blade being in the slot and extending from the pivot means and across the base face, the blade having a bearing face to engage the plate and being movable through the slot and the blade and also having opposite sides cooperating with the bearing face in defining metal cutting edges confronting and traversing the shearing edges on the foot to cooperate therewith in shearing a strip from the plate as the blade is oscillated, the blade having a hub portion adjacent the pivot means, said hub portion having a strip guiding deflector surface adjacent the bearing face and extending in a direction generally transverse to said metal cutting edges, said deflector surface being cam-shaped for varying the relationship between the deflector surface and the strip emerging from the slot as the blade is swingably oscillated, the cam-shaped portion of the deflector surface being convexly shaped,
and means for swingably oscillating the blade in the slot and across the shearing edges of the foot.

11. A heavy-duty plate cutting shear according to claim 8 and said stationery strip guiding panel portion having one edge portion disposed closely adjacent the hub portion of the blade.

12. A heavy duty-plate cutting shear to be carried on an elevated lifting device,
frame means with mounting means for attaching to such a device,
a slidable foot affixed on the frame means and having an unobstructed base face for engaging and sliding along the plate being sheared, the slidable foot having an elongate slot opening through the foot and through the base face thereof and the foot also having metal shearing edges at both sides of the slot and adjoining the face,
a swingably oscillatable blade having pivot means mounted on the foot, the blade being in the slot and extending from the pivot means and across the base face, the blade having a bearing face to engage the plate and being movable through the slot and also having opposite sides cooperating with the bearing face in defining metal cutting edges and confronting and traversing the shearing edges on the foot, there being an unobstructed space adjacent the foot and slot and confronting the bearing face of the blade to receive the strip cut from the plate,
guiding means on the frame means and adjacent the unobstructed space, said guiding means including a strip guiding panel portion opposite to and confronting the slot to receive and direct the strip sheared from the plate, the panel portion being oriented to deflect the strip generally along the foot and away from the pivot means,
a hydraulic cylinder means swingably oscillating the blade in the slot and across the shearing edges of the foot.

13. A heavy-duty plate cutting shear according to claim 12 and said strip guiding panel portion being oriented at an acute angle in relation to the base face, said acute angle diverging from the pivot means.

14. A heavy-duty plate cutting shear according to claim 12 and said foot including a tie bar affixed thereto and traversing the slot and in widely spaced relation with the pivot means.

15. A heavy-duty plate cutting shear to be carried on an elevating lifting device, comprising
frame means with mounting means for attaching to such a device,
a slidable foot affixed on the frame means and having an unobstructed base face for engaging and sliding along the plate being sheared, the slidable foot having an elongate slot opening through the base face and also having metal shearing edges at both sides of the slot and adjoining the face,
a swingably oscillatable blade having pivot means mounted on the foot, the blade being in the slot and extending from the pivot means and across the base face, the blade having metal cutting edges confronting and traversing the shear edges on the foot, and means for swingably oscillating the blade in the slot and across the shearing edges of the foot,
and said frame means having rotator means between the mounting means and the slidable foot for orienting the foot and shearing edges with respect to the mounting means.

16. A heavy-duty plate cutting shear according to claim 15 and said slidable foot having outer sides spaced from the slot.

17. A heavy-duty plate cutting shear according to claim 15 and the rotator means having a rotation axis extending generally transversely of said base face as to facilitate orienting the foot and blade at numerous orientations with respect to the mounting means.

18. A heavy-duty plate cutting shear to be carried on an elevating lifting device, comprising
frame means with mounting means for attaching to such a device,
a slidable foot affixed on the frame means and having an unobstructed base face for engaging and sliding along the plate being sheared, the slidable foot having an elongate slot opening through the base face and also having metal shearing edges at both sides of the slot and adjoining the face,
a swingably oscillatable blade having pivot means mounted on the foot, the blade being in the slot and extending from the pivot means and across the base face, the blade having metal cutting edges confronting and traversing the shear edges on the foot, and means for swingably oscillating the blade in the slot and across the shearing edges of the foot,
and the mounting means including a tilting means to tilt the slidable foot and base face to various orientations.

19. A heavy-duty plate cutting shear according to claim 1 wherein the metal cutting edges of the blade and the shearing edges of the foot being shaped relative to each other to traverse each other progressively away from the pivot means as the blade is closed onto the foot and moved into the slot.

20. A heavy-duty plate cutting shear to be carried on an elevating lifting device, comprising
  frame means with mounting means for attaching to such a device,
  a slidable foot affixed on the frame means and having an unobstructed base face for engaging and sliding along the plate being sheared, the slidable foot having an elongate slot opening through the base face and also having metal shearing edges at both sides of the slot and adjoining the face,
  a swingably oscillatable blade having pivot means mounted on the foot, the blade being in the slot and extending from the pivot means and across the base face, the blade having metal cutting edges confronting and traversing the shear edges on the foot, and means for swingably oscillating the blade in the slot and across the shearing edges of the foot,
  and the mounting means including a plurality of attachment devices to facilitate tilting of the frame as to tilt the face to multiple orientations approaching vertical and horizontal.

21. A heavy-duty plate cutting shear to be carried on an elevating lifting device, comprising
  frame means with mounting means for attaching to such a device,
  a slidable foot affixed on the frame means and having an unobstructed base face for engaging and sliding along the plate being sheared, the slidable foot having an elongate slot opening through the base face and also having metal shearing edges at both sides of the slot and adjoining the face,
  a swingably oscillatable blade having pivot means mounted on the foot, the blade being in the slot and extending from the pivot means and across the base face, the blade having metal cutting edges confronting and traversing the shear edges on the foot, and means for swingably oscillating the blade in the slot and across the shearing edges of the foot,
  the slidable foot having an elongate shape and having front and rear end portions, the rear end portion being adjacent the pivot means, the frame means including a reversible connection between said mounting means and the slidable foot to accommodate reversing the elongate foot in an end to end direction.

22. A heavy-duty plate cutting shear according to claim 15 and the mounting means including tilting means to tilt the slidable foot and base face to various orientations.

23. A heavy-duty plate shear according to claim 1 wherein the frame means is elongate between the mounting means and the slidable foot, said hydraulic cylinder being disposed between the mounting means and the foot.

24. A heavy-duty plate shear according to claim 4 and the metal cutting edge portions of the blade being substantially linear, the hub portion having a strip guiding portion extending obliquely of said metal cutting edge portions and guiding the sheared strip toward the stationary strip guiding panel portion as the hub portion is oscillated with the blade.

25. A heavy-duty plate shear according to claim 15 and the blade having a spearing point for piercing the plate to be sheared.

26. A heavy-duty plate shear according to claim 15 and said foot having a pair of mounting recesses adjacent the seat and a pair of inserts seated in said recesses and defining said metal shearing edges.

27. A heavy-duty plate cutting shear structure and hydraulic system of a hydraulic excavator machine, comprising
  frame means with mounting means for attaching to the boom structure of such a device, the mounting means including tilting means for attachment to said hydraulic system,
  an elongate slidable foot affixed on the frame means and having an unobstructed base face for engaging and sliding along the plate being sheared, the frame means including rotator means between the mounting means and the foot for variously orienting the foot with respect to the mounting, the slidable foot having an elongate slot opening through the base face and also having recesses adjacent the slot with hardened inserts mounted therein and defining metal shearing edges at both sides of the slot and adjoining the face, the foot having inner and outer end portions adjacent the slot, the outer end portion having a rigid tie traversing the slot and retaining the foot against spreading, the foot also having pivot means adjacent the inner end portion and spanning the slot and connected to the foot,
  a swingably oscillatable blade mounted on said pivot means and disposed in the slot, the blade extending forwardly from the pivot means and across the base face and having a bearing face to bear against the plate and to move through the slot, the blade also having opposite sides cooperating with the bearing face in defining metal cutting edge portions confronting and traversing the shearing edges on the foot from the plate, the blade also having a hub adjacent the pivot means and an operating arm extending rearwardly from the hub and obliquely of the cutting edges, the blade also having a strip guiding surface portion adjacent said hub and extending transversely of the metal cutting edge portions of the blade,
  a hydraulic cylinder mounted son the frame means and connected to said operating arm of the blade for swingably oscillating the blade into the slot and across the shearing edges of the foot,
  and a rigid strip deflecting panel portion confronting the foot and the slot therein and extending at an acute angle obliquely of the foot, the panel portion cooperating with the elongate space in defining an unobstructed space to receive the guided and deflected strip sheared from the plate.

* * * * *